(12) United States Patent
Luo et al.

(10) Patent No.: US 12,078,568 B2
(45) Date of Patent: Sep. 3, 2024

(54) VIBRATION EXCITING SYSTEM AND APPARATUS FOR TESTING AERO-ENGINE ROTOR

(71) Applicant: AECC Commercial Aircraft Engine Co., Ltd., Shanghai (CN)

(72) Inventors: Li Luo, Shanghai (CN); Ting Zhang, Shanghai (CN); Naixian Hou, Shanghai (CN)

(73) Assignee: AECC Commercial Aircraft Engine Co., Ltd., Shanghai (CN)

( * ) Notice: Subject to any disclaimer, the term of this patent is extended or adjusted under 35 U.S.C. 154(b) by 234 days.

(21) Appl. No.: 17/791,805

(22) PCT Filed: Aug. 19, 2021

(86) PCT No.: PCT/CN2021/113505
§ 371 (c)(1),
(2) Date: Jul. 8, 2022

(87) PCT Pub. No.: WO2022/179065
PCT Pub. Date: Sep. 1, 2022

(65) Prior Publication Data
US 2023/0168151 A1 Jun. 1, 2023

(30) Foreign Application Priority Data
Feb. 24, 2021 (CN) .......................... 202110205818.7

(51) Int. Cl.
*G01M 7/02* (2006.01)
*G01M 15/02* (2006.01)
*G01M 15/14* (2006.01)

(52) U.S. Cl.
CPC .............. *G01M 15/02* (2013.01); *G01M 7/02* (2013.01); *G01M 15/14* (2013.01)

(58) Field of Classification Search
CPC ........ G01M 15/02; G01M 15/14; G01M 7/00; G01M 7/02; G01M 7/027; G01M 7/045; G01M 7/08
See application file for complete search history.

(56) References Cited

U.S. PATENT DOCUMENTS 4,776,216 A    10/1988   Barton et al.
6,679,121 B2    1/2004   Sonnichsen et al.
(Continued)

FOREIGN PATENT DOCUMENTS

CN    101849169 A    9/2010
CN    205659840 U    10/2016
(Continued)

OTHER PUBLICATIONS

Extended European Search Report for EP 21895929.4, mailed on Jul. 5, 2023, 7 pages.
(Continued)

*Primary Examiner* — Suman K Nath
(74) *Attorney, Agent, or Firm* — STERNE, KESSLER, GOLDSTEIN & FOX P.L.L.C.

(57) ABSTRACT

The present disclosure provides a vibration exciting system and an apparatus for testing an aero-engine rotor, relating to the field of aero-engines, to improve the universality of the vibration exciting system. The vibration exciting system comprises a mounting ring, fixing parts, holders, guide rails, and nozzle assemblies. The mounting ring is configured to be annular; one ends of the fixing parts are fixedly connected to the mounting ring; the holders are slidably mounted at the other ends of the fixing parts, the plurality of holders being arranged circumferentially of the mounting ring; each guide rail connects two adjacent holders, connection positions of the guide rail and the holders being adjustable; and the nozzle assemblies are mounted on the holders. The radius size of a spraying area enclosed by the nozzle assemblies is (Continued)

adjusted by adjusting the positions of the holders on the fixing parts.

10 Claims, 4 Drawing Sheets

(56) References Cited

U.S. PATENT DOCUMENTS

| | | | |
|---|---|---|---|
| 8,353,204 B2 | 1/2013 | Mitaritonna et al. | |
| 9,823,159 B2* | 11/2017 | Huang | G01M 3/2846 |
| 11,105,707 B2* | 8/2021 | Gysling | G01M 15/14 |
| 11,248,987 B2* | 2/2022 | Han | G01M 7/022 |
| 2002/0083772 A1 | 7/2002 | Sonnichsen et al. | |
| 2011/0239771 A1* | 10/2011 | Wu | G01M 7/06 |
| | | | 73/663 |
| 2018/0321111 A1* | 11/2018 | Matsumoto | B06B 1/045 |

FOREIGN PATENT DOCUMENTS

| | | |
|---|---|---|
| CN | 108906434 A | 11/2018 |
| CN | 208810356 U | 5/2019 |
| CN | 110068439 A | 7/2019 |
| CN | 110216178 A | 9/2019 |
| CN | 110455485 A | 11/2019 |
| CN | 111693389 A | 9/2020 |
| WO | 2009034476 A2 | 3/2009 |

OTHER PUBLICATIONS

International Search Report and Written Opinion of the International Searching Authority directed to related International Patent Application No. PCT/CN2021/113505, mailed Nov. 22, 2021; 11 pages.

Notice of the First Review Opinion issued in Chinese Application No. 202110205818.7, mailed Jan. 5, 2023, 8 pages.

* cited by examiner

VIBRATION EXCITING SYSTEM AND APPARATUS FOR TESTING AERO-ENGINE ROTOR

CROSS-REFERENCE TO RELATED APPLICATIONS

This application is based on and claims priority to CN application No. 202110205818.7, filed on Feb. 24, 2021, the disclosure of which is hereby incorporated by reference in its entirety.

FIELD OF THE INVENTION

The present disclosure relates to the field of aero-engines, in particular to a vibration exciting system and an apparatus for testing an aero-engine rotor.

DESCRIPTION OF RELATED ART

Blade vibration caused by an unsteady flow field is inevitable in a service environment of turbine rotor blades of an aero-engine. An overhigh vibration load causes a fatigue failure of the turbine blades, resulting in a serious damage to the engine. Vibration stress of the turbine rotor blades is difficult to control to an allowable range. Experimental studies and simulation predictions on vibration characteristics and vibration levels of turbine rotor blades have been conducted in both China and other countries, and an edge plate damper has been designed for the rotor blades to reduce the blade vibration stress and prevent a high-cycle fatigue failure of the blades. High-cycle fatigue refers to fatigue of a material under the action of cyclic stress lower than its yield strength after more than 10,000 to 100,000 cycles.

The blade frequency of the high-pressure turbine rotor blades is very high, and the blades are in tongue-and-groove connection with the rotor. Testing is performed in a high-speed rotating state to test the resonant frequency of the blades and the vibration reduction effect of the damper, which is closer to centrifugal load conditions during engine operation, and achieves non-linear connection of the blades. More reliable test data is obtained by frictional motion between the damper and the blades.

In the related art, a test system uses a rotor system as a research object, and uses atomized oil droplets as an excitation source to implement non-contact excitation of the rotor blades on a high-speed rotating test bed to obtain the blade vibration characteristics of the rotor system and the vibration reduction effect of the damper.

The inventors have found at least the following problems in the related art: in the related art, the test system is only used for rotor systems of aero-engines of specific types and specific sizes, so the test system has low universality and the test cost is high; and test systems need to be designed separately for aero-engines of different models.

SUMMARY OF THE INVENTION

The present disclosure provides a vibration exciting system and a apparatus for testing an aero-engine rotor, to improve the universality of the vibration exciting system.

Some embodiments of the present disclosure provide a vibration exciting system, including:
a mounting ring configured to be annular;
a plurality of fixing parts, each having one end fixedly connected to the mounting ring;
a plurality of holders, each slidably mounted at the other end of each of the fixing parts, a plurality of holders being arranged circumferentially of the mounting ring;
a plurality of guide rails, each connecting two adjacent holders, connection positions of each of the guide rails and the adjacent holders being adjustable; and
a plurality of nozzle assemblies, mounted on the holders respectively.

In some embodiments, the guide rails are each provided with an arc-shaped slot, one of the two adjacent holders being connected to one end of the arc-shaped slot in a connecting position adjustable manner, and the other of the two adjacent holders being connected to the other end of the arc-shaped slot in a connecting position adjustable manner.

In some embodiments, the connection assembly includes:
a mounting seat mounted on the holder; and
a nozzle rotatably mounted on the mounting seat.

In some embodiments, a plurality of nozzle assemblies are mounted rotatably on each mounting seat.

In some embodiments, the mounting seat includes an oil supply cavity; and the nozzle assembly further includes:
a switching valve provided between the nozzle and the oil supply cavity of the mounting seat to control the on and off of an oil passage between the nozzle and the oil supply cavity.

In some embodiments, the vibration exciting system further includes:
an oil supply branch in fluid communication with the oil supply cavity.

In some embodiments, the switching valve is provided on the oil passage between each nozzle and the oil supply cavity.

In some embodiments, the holders are uniformly arranged circumferentially of the mounting ring.

Some embodiments of the present disclosure further provide an apparatus for testing an aero-engine rotor, including the vibration exciting system provided in any technical solution of the present disclosure.

In some embodiments, the apparatus for testing an aero-engine rotor further includes:
a test cavity, with the vibration exciting system being installed within the test cavity;
a rotor system mounted within the test cavity, the vibration exciting system being located outside of the rotor system; and
a driving component drivingly connected to the rotor system to drive the rotor system to rotate.

In the vibration exciting system of the above technical solution, the radius size of a spraying area enclosed by the nozzle assemblies is adjusted by adjusting the positions of the holders on the fixing parts, to adapt to the test requirements of different aero-engines. The closer the holders are to the edge of the mounting ring, the greater the distance between the two adjacent holders is. The closer the mounting positions of the holders on the arc-shaped slot are to the edge of the arc-shaped slot, the larger the radius of a spraying area corresponding to the nozzle assemblies is. The closer the holders are to the circle center of the mounting ring, the smaller the distance between the two adjacent holders is. The closer the mounting positions of the holders on the arc-shaped slot are to the middle of the arc-shaped slot, the smaller the radius of the spraying area corresponding to the nozzle assemblies is.

BRIEF DESCRIPTION OF THE DRAWINGS

Drawings described here are used to provide further understanding of the present disclosure and form a part of the present application. Illustrative embodiments of the present disclosure and description thereof are used for explaining the present disclosure, but do not improperly limit the present disclosure. In the drawings.

DESCRIPTION OF THE INVENTION

The technical solutions provided in the present disclosure will be described in more detail below in conjunction with FIGS. 1 to 5.

Figure 1:
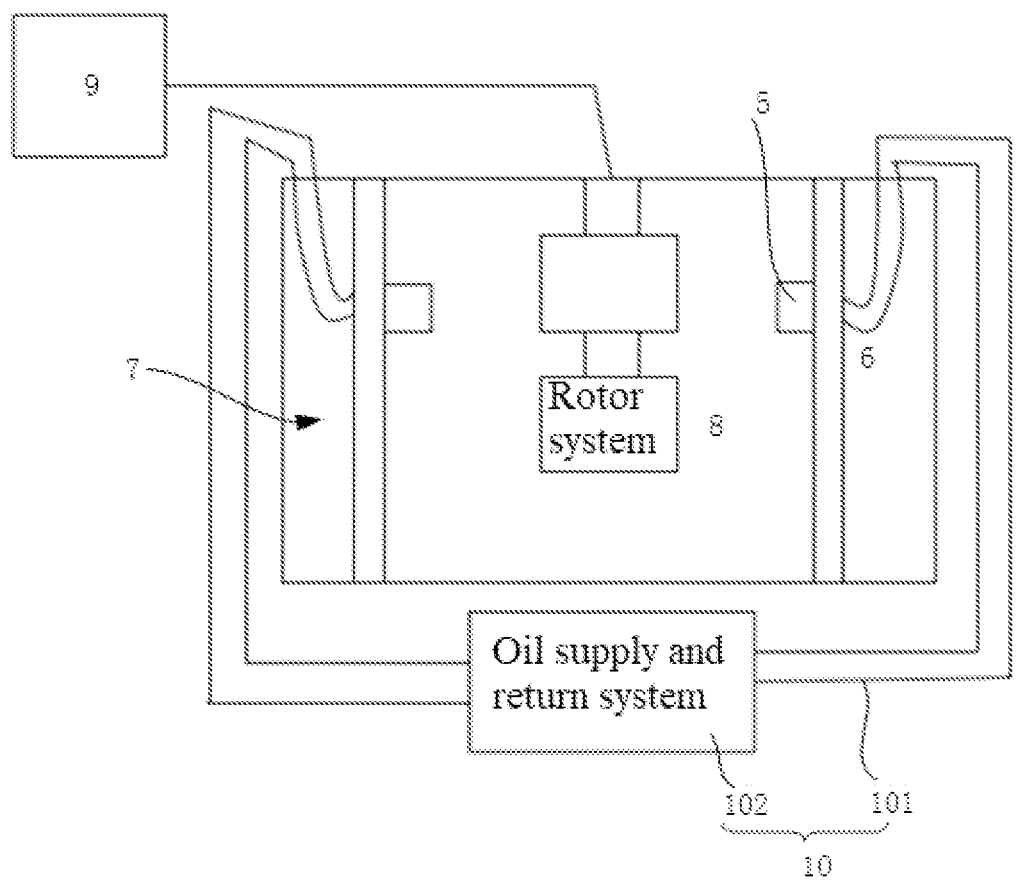
FIG. 1 is a structural diagram of application of a vibration exciting system provided in some embodiments of the present disclosure in an apparatus for testing an aero-engine rotor.
Figure 2:
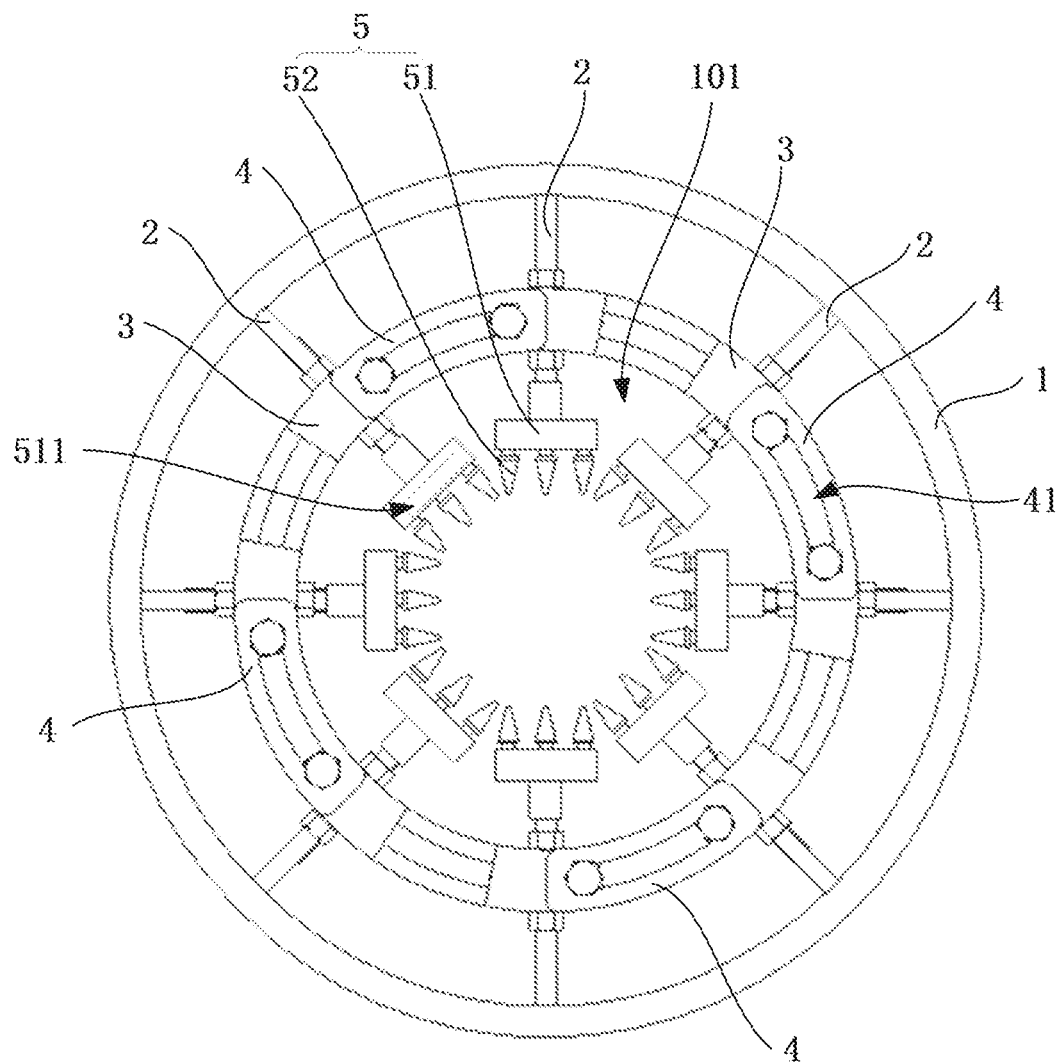
FIG. 2 is a structural diagram of the vibration exciting system provided in some embodiments of the present disclosure.

Referring to FIGS. 1 and 2, some embodiments of the present disclosure provide a vibration exciting system, which includes a mounting ring 1, a plurality of fixing parts 2, a plurality of holders 3, a plurality of guide rails 4, and a plurality of nozzle assemblies 5.

The mounting ring 1 is configured to be annular. The mounting ring 1 has a hole 101 in the middle. The fixing parts 2, the holders 3, the guide rails 4, and the nozzle assemblies 5 are all located in the hole 101 in the middle of the mounting ring 1. The diameter size of the mounting ring 1 is invariable. For aero-engines of different models, the diameter size of an area enclosed by the nozzle assemblies 5 is changed by adjusting the positions of the holders 3 on the fixing parts 2, thereby adapting to the test requirements of the aero-engines of different models.

One ends of each fixing parts 2 are fixedly connected to the mounting ring 1. The fixing parts 2 are, for example, rods. One ends of the fixing parts 2 are fixedly connected to the mounting ring 1, such as detachable connection, undetachable connection (e.g., welding). The plurality of fixing parts 2 are mounted circumferentially of the mounting ring 1, and each fixing part 2 is configured to mount one or more nozzle assemblies 5. In the following embodiments, one nozzle assembly 5 is mounted on each fixing part 2. The length direction of each fixing part 2 is along the radial direction of the mounting ring 1.

The holders 3 are slidably mounted on the other ends of the fixing parts 2, specifically by bolted connection, for example. The plurality of holders 3 are arranged circumferentially of the mounting ring 1. The farther the holders 3 are from the circle center of the mounting ring 1, the larger the radius of an area enclosed by the holders 3 is, and the larger the size of the corresponding aero-engine is. Conversely, the closer the holders 3 are to the circle center of the mounting ring 1, the smaller the radius of the area enclosed by the holders 3 is, and the smaller the size of the corresponding aero-engine is. The radius size of the area enclosed by the holders 3 is adjusted by adjusting the positions of the holders 3 on the fixing parts 2, thereby adapting to the test requirements of rotor systems 8 of aero-engines of different sizes, so as to adapt to the test requirements of vibration characteristics and damper vibration reduction effects of the engine rotor systems 8 of different models and sizes; and the adjustment process is convenient and fast.

Referring to FIG. 2, in some embodiments, the holders 3 are uniformly arranged circumferentially of the mounting ring 1. Each holder 3 is an arc segment. The plurality of holders 3 are uniformly spaced circumferentially of the mounting ring 1. This achieves uniform oil spraying circumferentially of the mounting ring 1 as a test requires. In other embodiments, the nozzle assemblies 5 on some of the holders 3 dispense oil, and the nozzle assemblies 5 on the rest of the holders 3 do not dispense oil.

Figure 3:
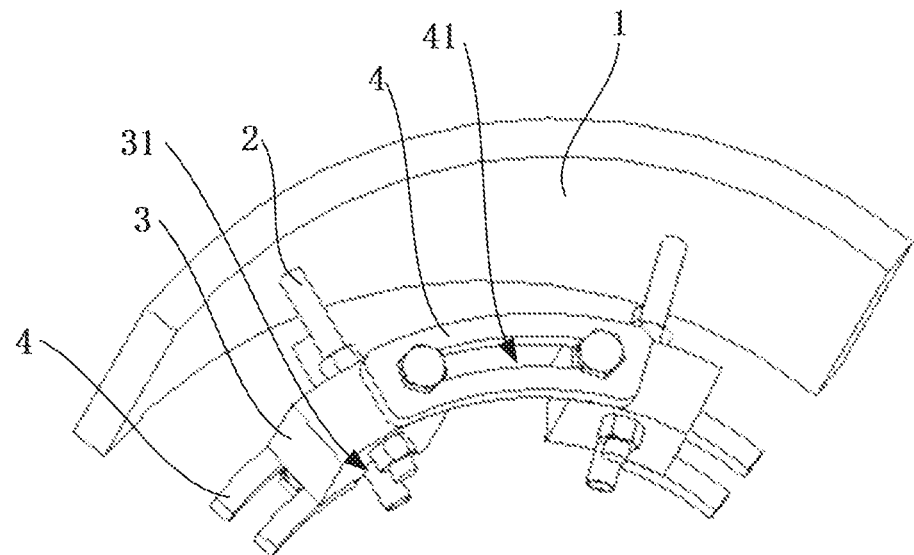
FIG. 3 is a partial structural diagram at is a holder of the vibration exciting system provided in some embodiments of the present disclosure.

Referring to FIG. 2, guide rail 4 connects two adjacent holders 3, and connection positions of the guide rail 4 and the two adjacent holder 3 are adjustable. The guide rail 4 is connected to the holders 3 by bolts. By means of the guide rails 4, a circle of holders 3 are fixedly connected together to improve the structural stability of the vibration exciting system, so that the nozzle assemblies 5 are securely mounted. The guide rails 4 are placed on the top surfaces of the holders 3 as shown in FIG. 3, or on the bottom surfaces of the holders 3 as shown in FIG. 3. FIG. 3 shows an example in which one of two adjacent guide rails 4 is placed on the top surfaces of the holders 3 and the other is placed on the bottom surfaces of the holders 3. In this arrangement, the guide rails 4 occupy less space and the dimensions of the holders 3 are also designed to be as small as possible.

Referring to FIGS. 2 and 3, in some embodiments, the guide rail 4 is provided with an arc-shaped slot 41, one of the two adjacent holders 3 being connected to one end of the arc-shaped slot 41 in a position adjustable manner, and the other of the two adjacent holders 3 being connected to the other end of the arc-shaped slot 41 also in a mounting position adjustable manner. The closer the holders 3 are to the edge of the mounting ring 1, the greater the distance between the two adjacent holders 3 is. The closer the mounting positions of the holders 3 on the arc-shaped slot 41 are to the edge of the arc-shaped slot 41. The closer the holders 3 are to the circle center of the mounting ring 1, the smaller the distance between the two adjacent holders 3 is, and the closer the mounting positions of the holders 3 on the arc-shaped slot 41 are to the middle of the arc-shaped slot 41.

Referring to FIG. 2, the nozzle assemblies 5 are mounted on the holders 3. The nozzle assemblies 5 are configured to spray lubricating oil. Each nozzle assembly 5 includes one or more nozzles 52. The nozzles 52 included in the nozzle assembly 5 use a known atomization structure.

Referring to FIG. 2, the nozzle assembly 5 includes a mounting seat 51 and nozzles 52. The mounting seat 51 is mounted on the holder 3. The nozzles 52 are rotatably mounted on the mounting seat 51. The structure of the mounting seat 51 is, for example, stereoscopic or cuboidal. The mounting base 51 as the base for carrying the nozzles 52 is flexible in structural design.

Referring to FIG. 2, in some embodiments, there are a plurality of mounting seats 51, and the plurality of mounting seats 51 are arranged around an inner circle of the mounting ring 1. The plurality of mounting seat 51 enclose a circle, and at least some areas of rotor blades to be sprayed are located within the circle enclosed by the mounting seats 51. A plurality of nozzle assemblies 52 are mounted rotatably on each mounting seat 51. Specifically, for example, a ball joint 11 is used to achieve rotatable connection so that each nozzle 52 is flexibly rotated at an angle to achieve an adjustable oil spraying angle of each nozzle 52. Moreover, the oil spraying angle of each nozzle 52 is adjusted individually, and the oil spraying directions of the nozzles 52 located on the same mounting seat 51 is same or different. The oil spraying directions of the nozzles 52 point to the circle center of the mounting ring 1, or do not point to the circle center of the mounting ring 1, as long as the nozzles 52 spray oil to the rotor blades. Thus, for turbine rotor blades with flexural and torsional surfaces of blade bodies, vibration excitation is also achieved effectively for the blade bodies. Moreover, by adjusting the oil dispensing angles of the nozzles 52, angles more favorable to the excitation of blade resonance are obtained, and the adjustment of the range of atomized oil excited to the blade bodies is also achieved.

Figure 4:
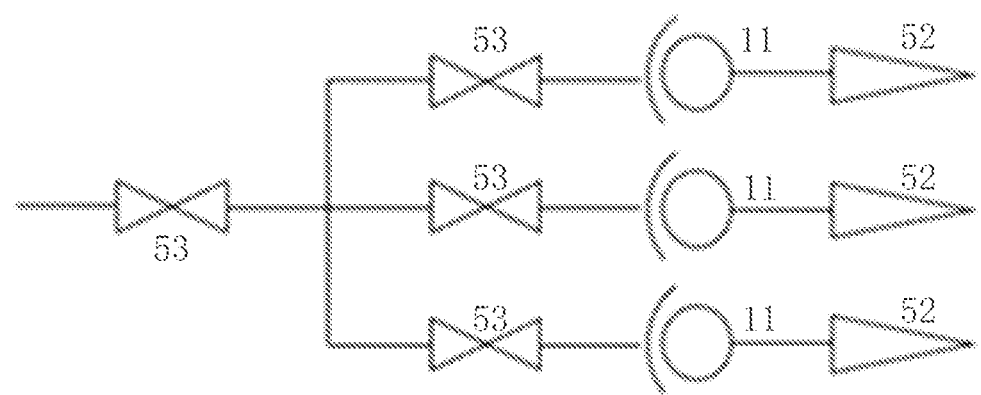
FIG. 4 is a principle diagram of an oil passage at a switching valve of the vibration exciting system provided in some embodiments of the present disclosure.

Referring to FIGS. 2 and 4, in some embodiments, the mounting seat 51 includes an oil supply cavity 511. The oil supply cavity 511 is located as shown in FIG. 2. All nozzles 52 corresponding to one mounting seat 51 share an oil supply cavity 511, or each nozzle 52 is provided with an oil supply cavity 511 respectively, or some of all nozzles 52 corresponding to one mounting seat 51 share an oil supply cavity 511. The nozzle assembly 5 further includes a switching valve 53. The switching valve 53 is provided between the nozzles 52 and the oil supply cavity 511 of the mounting seat 51 to control the on and off of oil passages between the nozzles 52 and the oil supply cavity 511. The switching valve 53 is, for example, a solenoid valve, and the switching valve 53 has two valve positions: an on-valve position and an off-valve position. When the switching valve 53 is in the on-valve position, the oil passages between the nozzles 52 and the oil supply cavity 511 are turned on, such that oil flows from the oil supply cavity 511 to the nozzles 52 and then be sprayed out via the nozzles 52. When the switching valve 53 is in the off-valve position, the oil passages between the nozzles 52 and the oil supply cavity 511 are turned off, such that oil don't flow from the oil supply cavity 511 to the nozzles 52. The volume of the oil supply cavity 511 is greater than the sum of flow areas of the nozzles 52 communicated with the oil supply cavity 511.

Referring to FIGS. 1, 2 and 4, in some embodiments, the vibration exciting system further includes an oil supply branch 6. The oil supply branch 6 is in fluid communication with the oil supply cavity 511, and the oil supply branch 6 is configured to convey external oil to the oil supply cavity 511 to be sprayed by the nozzles 52 in fluid communication with the oil supply cavity 511. Specifically, one end of the oil supply branch 6 is in fluid communication with an external oil circuit 10, and the other end of the oil supply branch 6 is in fluid communication with the nozzles 52. To facilitate the arrangement of the oil supply branch 6, the holder 3 is provided with a mounting hole 31, and a pipeline of the oil supply branch 6 passes through the mounting hole 31.

The external oil circuit includes a plurality of oil pipes 101 and an oil supply and return system 102. Oil is conveyed from the oil supply and return system 102 to the oil supply branch 6 through some oil pipes 101, and the used oil is recovered and then conveyed back to the oil supply and return system 102 via other oil pipes 101. The oil supply and return system 102 achieves recycling of the oil.

Referring to FIG. 4, in some embodiments, the switching valve 53 is provided on the oil passage between each nozzle 52 and the oil supply cavity 511. This achieves separate control of each nozzle 52. During testing, among a circle of nozzles 52 of the vibration exciting system, some spray oil, while the others do not spray oil. These oil spraying nozzles 52 are adjacent to or spaced apart from each other, or some are adjacent and some are spaced apart. Of course, in some embodiments the circle of nozzles 52 all spray oil.

Since the number of the oil spraying nozzles 52 is related to a rotational speed of the rotor system 8 and a frequency of the rotor blades, further, according to the operating speed of the rotor system 8 and a frequency range of the blades, the nozzle assembly 5 enables a corresponding number of nozzles 52 to spray oil, and the oil supplying nozzles 52 are spaced apart by the same distance to ensure that each blade obtains the same amount of excited oil and pressure, such that the amount of oil spraying excitation can be adjusted on an apparatus to adapt to a vibration test of the same rotor system 8 at different rotational speeds. Under the condition of high-speed rotation, the excitation frequency for exciting the rotor blades of the engine needs to satisfy the following equation:

$$F = N \times n / 60$$

In the formula, F is the excitation frequency in Hz; N is the number of nozzles; and n is the rotational speed in r/m.

In the above technical solution, during testing, the number of the oil dispensing nozzles 52 is adjusted according to different rotational speeds of the engine, specifically in such a manner that, for example, all the nozzles 52 on some mounting seats 51 dispense oil, or all the nozzles 52 on all mounting seats 51 dispense oil, or only some of the nozzles 52 on each mounting seat 51 dispense oil, or for a circle of nozzles 52, the nozzles 52 dispense oil in a spaced manner, i.e. one nozzle 52 that does not dispense oil is sandwiched between two oil dispensing nozzles 52. For these oil dispensing nozzles 52, the oil dispensing angle of each nozzle 52 is adjusted individually very conveniently. Moreover, for the same rotor blades to be tested, a test is repeated several times, and the number and positions of the oil dispensing nozzles 52 are also optimally adjusted according to test results to achieve the best test results. For rotor blades of different models, the number and positions of the nozzles 52 that need to dispense oil are also adjusted separately. It can be seen that the above technical solution achieves the test repeatability and the test accuracy, but also achieves flexible setting of test conditions.

Referring to FIG. 1, some embodiments of the present disclosure further provide an apparatus for testing an aero-engine rotor, including the vibration exciting system provided in any technical solution of the present disclosure.

An aero-engine is a highly complex and sophisticated thermodynamic machine that provides power for the flight of an aircraft. The rotor is a rotating body supported by a bearing. Vibration refers to reciprocating motion, and the vibration is closely related to its own frequency, excitation frequency, and excitation magnitude. The apparatus for testing an aero-engine rotor is used to test the vibration and a damper vibration reduction effect of the rotor system 8 in a high-speed rotating state.

Figure 5:
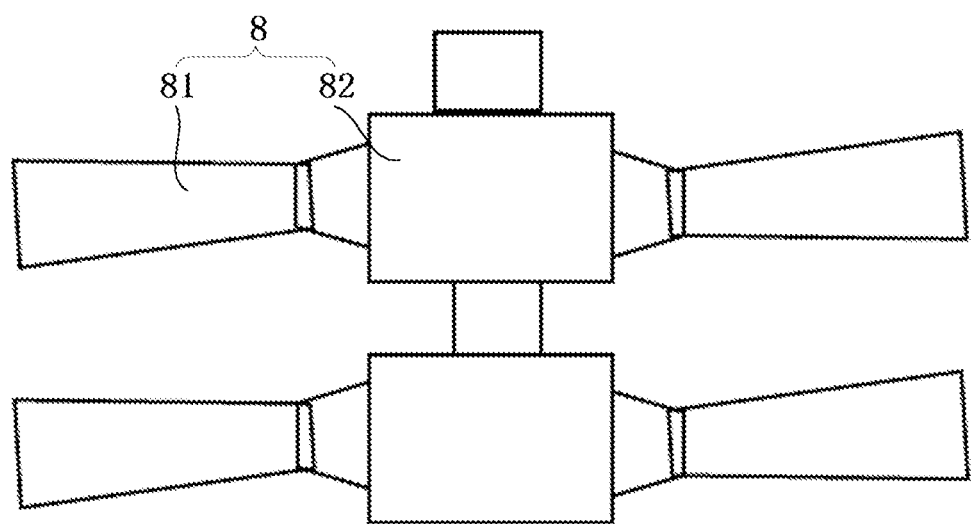
FIG. 5 is a structural diagram of a rotor system on which the vibration exciting system provided in some embodiments of the present disclosure operates.

Referring to FIGS. 1 and 5, in some embodiments, the apparatus for testing an aero-engine rotor further includes a test cavity 7, a rotor system 8, and a driving component 9. The vibration exciting system is installed within the test cavity 7. The rotor system 8 is also mounted within the test cavity 7, and the vibration exciting system is located on the circumferential outside of the rotor system 8. The driving component 9 is drivingly connected to the rotor system 8 to drive the rotor system 8 to rotate. The driving component 9 is, for example, a motor. The motor is arranged outside the test cavity 7 and transmits power to the rotor system 8 through a transmission shaft.

The rotor system 8 of a high-pressure turbine includes rotor blades 81 and a disc 82. The frequency of the rotor blades 81 is very high, and the rotor blades 81 are connected to the wheel disc 82 by means of a tongue-and-groove non-linear connection structure. The resonant frequency of the rotor blades 81 and the vibration reduction effect of a damper are tested in a real high-speed rotating state, which is closer to centrifugal load conditions during engine operation, achieves the non-linear connection structure of the rotor blades 81, and frictional motion of the damper and rotor blades 81, and obtains more reliable test data. The excitation mode at the high-speed rotating state, that is, implementing atomized oil excitation of the rotor blades 81 on a high-speed rotating test bed, is a practical and feasible way that excites an effective response from high-frequency blades.

In description of the present disclosure, it should be understood that orientation or position relations denoted by the terms "center", "longitudinal", "transverse", "front", "rear", "left", "right", "vertical", "horizontal", "top", "bottom", "inner", "outer" and the like are orientation or position relations illustrated based on the drawings, are merely for the convenience of describing the present disclosure and simplifying description, instead of indicating or implying the denoted devices or elements must have specific orientations or be constructed and operated in specific orientations, and thus the terms cannot be construed as limiting the protection scope of the present disclosure.

Finally, it should be noted that the above embodiments are only used for describing rather than limiting the technical solutions of the present disclosure. Although the present disclosure is described in detail with reference to the preferred embodiments, those of ordinary skill in the art should understand that they still can make modifications to the specific implementations in the present disclosure or make equivalent substitutions to part of technical features thereof; and such modifications and equivalent substitutions should be encompassed within the scope of the technical solutions sought for protection in the present disclosure so long as they do not depart from the spirit of the technical solutions of the present disclosure.

The invention claimed is:

1. A vibration exciting system, comprising:
   a mounting ring, configured to be annular;
   a plurality of fixing parts, each having one end fixedly connected to the mounting ring;
   a plurality of holders, each slidably mounted at the other end of each of the fixing parts, the plurality of holders being arranged circumferentially of the mounting ring;
   a plurality of guide rails, each connecting two adjacent holders, connection positions of each of the guide rails and the two adjacent holder being adjustable; and
   a plurality of nozzle assemblies, mounted on the holders respectively.

2. The vibration exciting system according to claim 1, wherein the guide rails are each provided with an arc-shaped slot, one of the two adjacent holders being connected to one end of the arc-shaped slot in a connecting position adjustable manner, and the other of the two adjacent holders being connected to the other end of the arc-shaped slot in a connecting position adjustable manner.

3. The vibration exciting system according to claim 1, wherein the nozzle assembly comprises:
   a mounting seat mounted on the holder; and
   a nozzle rotatably mounted on the mounting seat to adjust an oil spraying angle of the nozzle.

4. The vibration exciting system according to claim 3, wherein the plurality of nozzle assemblies are mounted rotatably on each mounting seat.

5. The vibration exciting system according to claim 3, wherein the mounting seat comprises an oil supply cavity; and the nozzle assembly further comprises:
   a switching valve provided between the nozzle and the oil supply cavity of the mounting seat to control the on and off of an oil passage between the nozzle and the oil supply cavity.

6. The vibration exciting system according to claim 5, further comprising:
   an oil supply branch in fluid communication with the oil supply cavity.

7. The vibration exciting system according to claim 5, wherein the switching valve is provided on the oil passage between each nozzle and the oil supply cavity.

8. The vibration exciting system according to claim 1, wherein the holders are uniformly arranged circumferentially of the mounting ring.

9. An apparatus for testing an aero-engine rotor, comprising the vibration exciting system of claim 1.

10. The apparatus for testing an aero-engine rotor according to claim 9, further comprising:
    a test cavity, with the vibration exciting system being installed within the test cavity;
    a rotor system mounted within the test cavity, the vibration exciting system being located outside of the rotor system; and
    a driving component drivingly connected to the rotor system to drive the rotor system to rotate.

* * * * *